United States Patent
Hayashi

(10) Patent No.: US 6,345,033 B1
(45) Date of Patent: Feb. 5, 2002

(54) OPTICAL DISK AND OPTICAL DISK REPRODUCING APPARATUS

(75) Inventor: Hideki Hayashi, Tsurugashima (JP)

(73) Assignee: Pioneer Corporation, Tokyo-to (JP)

(*) Notice: Subject to any disclaimer, the term of this patent is extended or adjusted under 35 U.S.C. 154(b) by 0 days.

(21) Appl. No.: 09/671,112

(22) Filed: Sep. 28, 2000

(30) Foreign Application Priority Data

Oct. 1, 1999 (JP) .......................................... 11-281992

(51) Int. Cl.$^7$ ................................................. G11B 7/00
(52) U.S. Cl. ................. 369/275.4; 369/59.1; 369/59.12
(58) Field of Search ........................... 369/44.27, 44.26, 369/44.28, 44.34, 47.1, 47.11, 47.28, 47.37, 53.1, 53.11, 53.28, 53.41, 59.1, 59.11, 59.12, 59.25, 60.01, 275.1, 275.3, 275.4

(56) References Cited

U.S. PATENT DOCUMENTS 6,046,968 A * 4/2000 Abramovitch et al. ... 369/47.28
6,215,751 B1 * 4/2001 Tsuchinaga .............. 369/47.35

FOREIGN PATENT DOCUMENTS

JP 10-74322 3/1998

* cited by examiner

Primary Examiner—Muhammad Edun
(74) Attorney, Agent, or Firm—Morgan, Lewis & Bockius LLP

(57) ABSTRACT

An optical disk on which digital data is recorded by a pit edge multi-value recording system includes: a plurality of data areas formed with a plurality of data pits with a predetermined pit period, each of the plurality of data pits including one of a plurality of pit edge positions each corresponding to the digital data; and a plurality of servo areas formed with servo reference pits used for servo control. The data areas and the servo areas are formed alternately with each other in a circumferential direction of the optical disk. The servo area includes synchronization pits functioning as synchronization reference in reproducing the optical disk. A pit period 2L of the data pit and a pit length P of the synchronization pit satisfy the following equation:

$P = N \times L$ (N is an integer not less than 2).

14 Claims, 9 Drawing Sheets

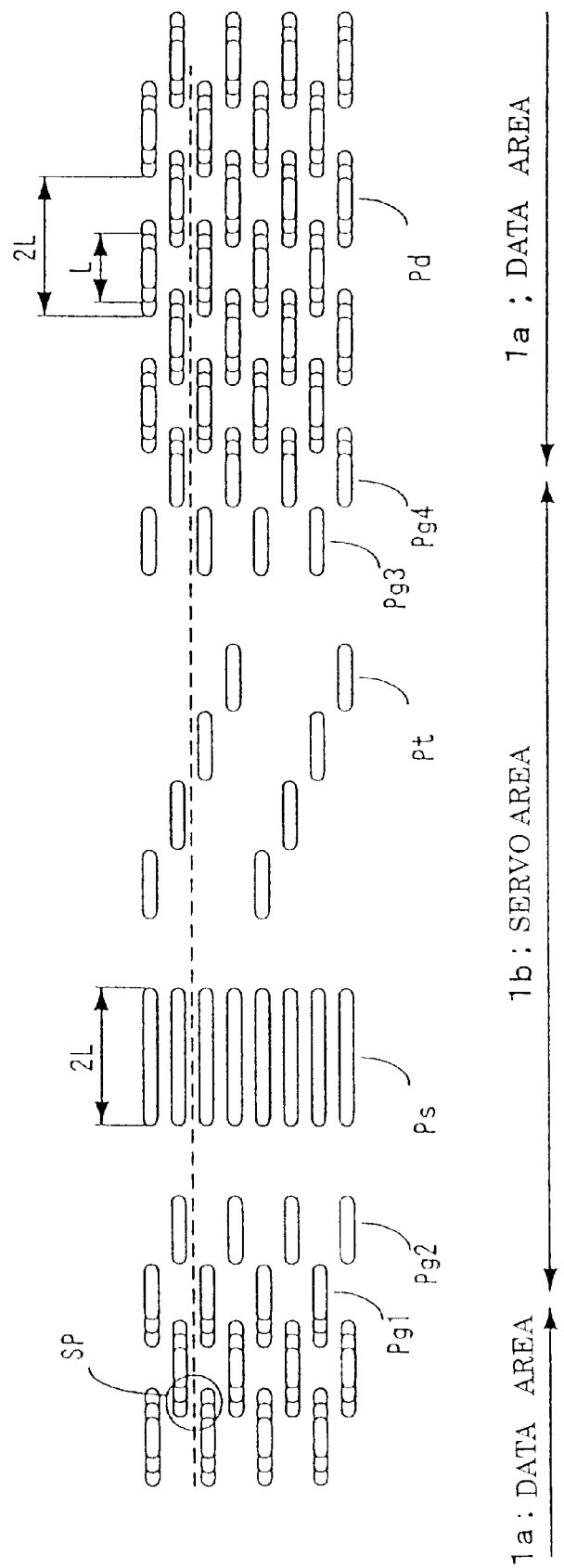

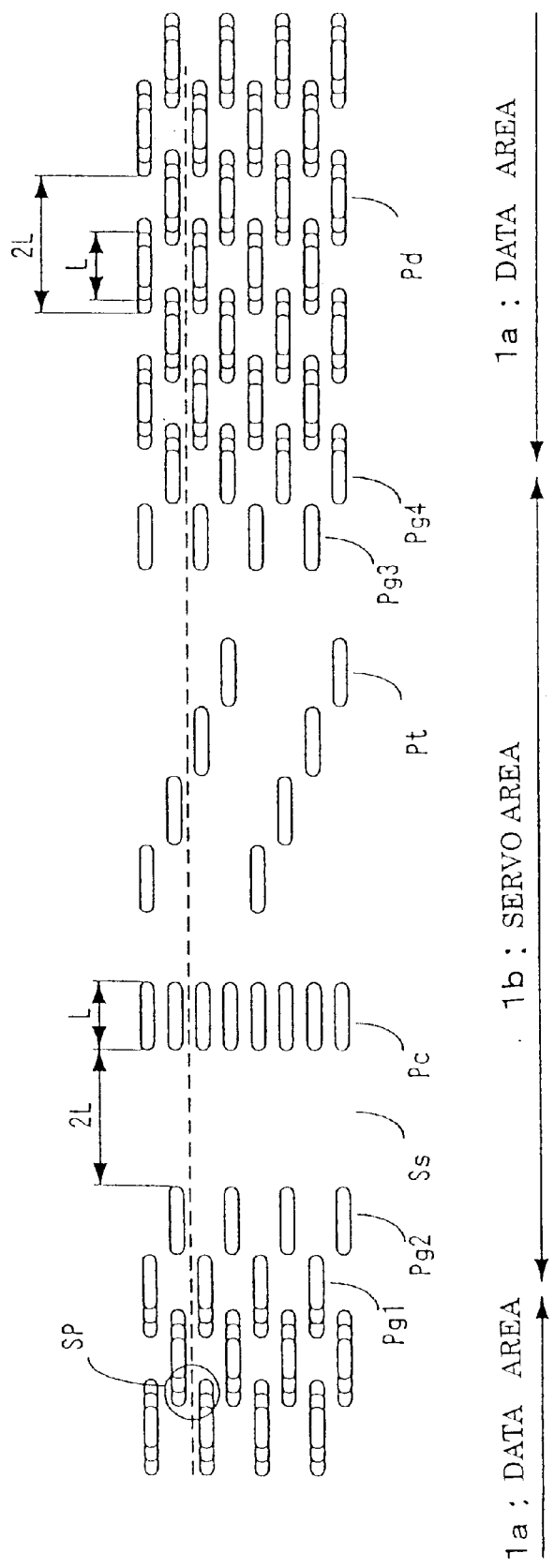

OPTICAL DISK AND OPTICAL DISK REPRODUCING APPARATUS

BACKGROUND OF THE INVENTION

1. Field of the Invention

The present invention relates to an optical disk on which digital data is recorded. The present invention particularly relates to an optical disk on which digital data is recorded with high density by using a pit edge multi-value recording system and an optical disk reproducing apparatus for decoding the digital data from the optical disk to reproduce it.

2. Description of Related Art

Nowadays, as a system for recording and reproducing digital data on and from an optical disk with high density, there has been developed a pit edge multi-value recording system for recording digital data by modulating positions of pit edges on the optical disk into multiple steps. In this pit edge multi-value recording system, positions of the pit edges are changed in multi-steps according to digital data to record multi-value digital data as positional information of the pit edges. By radiating an optical beam between, for example, two adjoining recording tracks, an RPR (Radial Direction Partial Response) reproducing system reproduces a plurality of pit edges at the same time on the basis of a reflected light from the optical disk. By employing the pit edge multi-value recording system and the RPR reproducing system, the digital data can be recorded on the optical disk with higher density. For example, these systems are disclosed in Japanese Laid-Open Patent Application No. 10-74322.

Generally, digital data of two values is recorded on an optical disk such as an existing CD and DVD, and RLL (Run Length Limited) code is used which limits the maximum value and the minimum value of a run length indicating the length of the digital data of the same sign. In the case of DVD, an 8/16 modulation system, which is a kind of RLL code, is employed. In this 8/16 modulating system, with respect to the channel clock period T, the run length of the modulation code is limited to the range from 3T to 11T. A run length 14T, which exceeds this range, may be defined as a synchronous code. Further, since the run length is limited, it is possible to reproduce a clock by using a pulse edge of the reproduced two-value pulse as a phase reference. Further, the 8/16 modulation system is a kind of DC-free code in which digital data sequence has no direct current component, so that recorded codes can be restored even if direct current component is removed from an analog reproduction signal.

On the contrary, in the above mentioned pit edge multi-value recording system, since RLL code which is effective for multi-value digital data is not known, the run length cannot be limited, and hence synchronous code having the maximum length cannot be defined. In addition, since the run length is not limited, there is a problem that it is difficult to reproduce clock by using pulse edges of multi-value pulses as phase reference. Still further, since DC-free code which is effective for multi-value digital data is not known, recorded code cannot be restored if direct current component is removed from analog reproduction signal.

SUMMARY OF THE INVENTION

The present invention has been made taking the foregoing problems into consideration, and an object of which is to provide an optical disk and an optical disk reproducing apparatus which are capable of securely detecting synchronization, stably reproducing clock and reproducing more accurate digital data at the time of reproducing an optical disk on which digital data is stored by a pit edge multi-value recording system.

According to one aspect of the present invention, there is provided an optical disk on which digital data is recorded by a pit edge multi-value recording system, including: a plurality of data areas formed with a plurality of data pits with a predetermined pit period, each of the plurality of data pits including one of a plurality of pit edge positions each corresponding to the digital data; and a plurality of servo areas formed with servo reference pits used for servo control, the data areas and the servo areas being formed alternately with each other in a circumferential direction of the optical disk, the servo area including synchronization pits functioning as synchronization reference in reproducing the optical disk, wherein a pit period 2L of the data pit and a pit length P of the synchronization pit satisfy the following equation:

$$P = N \times L \text{ (N is an integer not less than 2).}$$

When this optical disk is reproduced, amplitude of a reproduction signal in a segment corresponding to the synchronization pit may be sufficiently long, and hence the synchronization detection can be performed by detecting the amplitude of the reproduction signal.

The data pits may be arranged such that the data pits formed on two neighboring tracks are in reverse phase with each other, and the synchronization pits may be arranged such that the synchronization pits formed on two neighboring recording tracks are in alignment with each other in a radial direction of the optical disk. By this, if the center line of two neighboring tracks is traced by a light beam, the amplitude of the reproduction signal is larger in the synchronization pit segment than that in the data pit segment. Thus, the synchronization pits may be readily detected, and the synchronization detection may be performed more reliably.

According to another aspect of the present invention, there is provided an optical disk on which digital data is recorded by a pit edge multi-value recording system, including: a plurality of data areas formed with a plurality of data pits with a predetermined pit period, each of the plurality of data pits including one of a plurality of pit edge positions each corresponding to the digital data; and a plurality of servo areas formed with servo reference pits used for servo control, the data areas and the servo areas being formed alternately with each other in a circumferential direction of the optical disk, the servo area including synchronization spaces functioning as synchronization reference in reproducing the optical disk, wherein a pit period 2L of the data pit and a length S of the synchronization space satisfy the following equation:

$$S = N \times L \text{ (N is an integer not less than 2).}$$

When this optical disk is reproduced, amplitude of a reproduction signal in a segment corresponding to the synchronous space may be sufficiently long, and hence the synchronization detection can be performed by detecting the amplitude of the reproduction signal.

The data pits may be arranged such that the data pits formed on two neighboring tracks are in reverse phase with each other, and the synchronization spaces may be arranged such that the synchronization spaces formed on two neighboring recording tracks are in alignment with each other in a radial direction of the optical disk. By this, if the center line of two neighboring tracks is traced by a light beam, the amplitude of the reproduction signal is larger in the synchronization pit segment than that in the data space segment. Thus, the synchronization pits may be readily detected, and the synchronization detection may be performed more reliably.

According to still another aspect of the present invention, there is provided an optical disk reproducing apparatus for reproducing an optical disk described above, including: a reading unit for irradiating a laser beam onto the optical disk to generate a reproduction signal; and a synchronization detecting unit for detecting segments, in which the reproduction signal has an amplitude larger than a predetermined value, as a segment corresponding to the synchronization pit or space and for outputting a synchronization detection signal, wherein the synchronization detection signal is used as a synchronization reference in reproducing the optical disk.

In accordance with the apparatus, the reading unit irradiates the laser beam to produce the reproduction signal. Since the amplitude of the reproduction signal at the synchronization pits or spaces exceeds the predetermined value, the synchronization signal may be detected at that timing. Therefore, by determining the synchronization reference in reproduction based on this synchronization detection signal, the reproduction operation may be reliably achieved.

According to another aspect of the present invention, there is provided an optical disk reproducing apparatus for reproducing an optical disk described above, including: a reading unit for irradiating a laser beam onto a center line of two neighboring recording tracks on the optical disk to generate a reproduction signal; and a synchronization detecting unit for detecting segments, in which the reproduction signal has a peak level larger than a predetermined threshold value, as a segment corresponding to the synchronization pit or space and for outputting a synchronization detection signal, wherein the synchronization detection signal is used as a synchronization reference in reproducing the optical disk.

In accordance with the apparatus, the reading unit irradiates the light beam to trace the center line of two recording tracks to generate the reproduction signal. The synchronization detection unit outputs the synchronization detection signal. Since the synchronization pits are aligned in the radial direction of the disk, the peak level of the reproduction signal is stable. Since the data pits are formed alternately in the radial direction of the disk, the amplitude of the reproduction signal becomes smaller, and the detection of the synchronization pits or spaces may become easier. Therefore, by determining the synchronization reference based on the synchronization detection signal, the reproduction operation may be reliably synchronized.

The apparatus may further include: an A/D converter for sampling the reproduction signal in synchronism with reproduction clock to produce sample value sequence and for outputting the sample value sequence; and a clock reproduction unit for generating reproduction clock based on the sample value sequence. Thus, the reproduction signal may be sampled at correct timings, and the digital data may be accurately reproduced.

The clock reproduction unit may control frequency of the reproduction clock based on a period of the synchronization detection signal. Thus, the frequency of the reproduction clock may be easily maintained, and the stable reproduction clock may be supplied.

The clock reproduction unit may control phase of the reproduction clock based on plural sample values corresponding to positions of the synchronization pits. Thus, the phase of the reproduction clock may be maintained stably to correspond to the position of the synchronization pits or spaces.

The apparatus may further include a direct current level corrector for correcting direct current level of the sample value sequence based on the plural sample values corresponding to the positions of the synchronization pits. Thus, even if the direct current component is removed from the read signal, the direct current may be restored in the sample value sequence, and hence the digital data may be correctly reproduced.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 1 is an explanatory view illustrating a pit arrangement of an optical disk according to the present embodiment;

FIG. 9 is an explanatory view illustrating pit positions of an optical disk according to a modified embodiment.

DESCRIPTION OF THE PREFERRED EMBODIMENTS

Preferable embodiments according to the present invention will be described below with reference to the accompanying drawings.

Figure 2B:
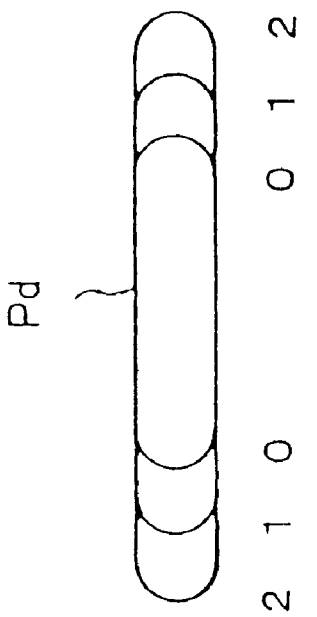
FIG. 2 is an explanatory view illustrating position variation of a three-value pit edge in a pit edge multi-value recording system.
Figure 2A:
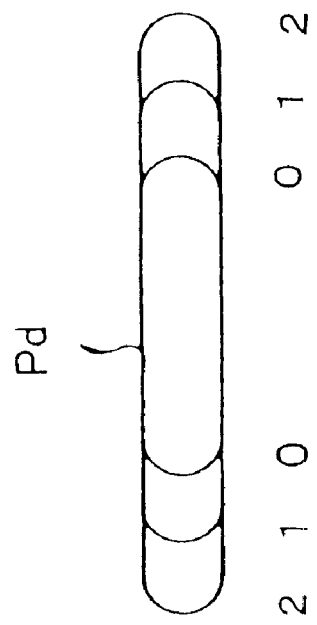

At first, a pit arrangement of an optical disk according to the present invention will be explained with reference to FIGS. 1 and 2. FIG. 1 is an explanatory view illustrating a pit arrangement of an optical disk according to the present embodiment. FIG. 2 is an explanatory view illustrating position variation of a three-value pit edges in a pit edge multi-value recording system.

As shown in FIG. 1, an optical disk 1 is formed, in an alternative manner, with two areas, i.e., data areas 1a in which pits carrying digital data are formed and servo areas 1b in which pit patterns to be used for respective servo control at the time of reproduction are formed. These areas are aligned in a line in a disk radial direction. In the present embodiment, the explanation is given to the case that the optical disk 1 for reproduction only is employed.

In the data area 1a, data pits Pd are arranged with constant intervals on a recording track of the optical disk 1. The respective data pits Pd carry a three-value digital data by varying a pit edge position in multi-step on the basis of a pit edge multi-value recording format. Specifically, in order to store the three-value digital data of (0, 1, 2), as shown in FIG. 2, the pit edge position is shifted by a predetermined distance in a direction that a pit length becomes shorter if the recorded data is "0", the pit edge position remains unchanged if the recorded data is "1", and the pit edge position is shifted at a predetermined distance in a direction that a pit length becomes longer if the recorded data is "2". Thus, three-value digital data may be stored by the respective data pits Pd as a pit edge position information. In FIG. 2, while three pit edge positions are illustrated in a superimposed manner, only one of them is used as a single pit edge in practice.

As shown in FIG. 1, the data pit Pd has a central value L of the pit length and a pit period 2L. In other words, the pit corresponding to digital data "1" has a pit length L. The adjacent data pits Pd in the recording track direction are regularly arranged with an interval 2L therebetween. While the present embodiment has a pit period 2L of the data pit Pd and the pit length L and a duty of 50%, the pit length of the data pit Pd may be slightly longer or shorter than L.

Between the adjacent recording tracks, positions in a disk circumferential direction of the data pits Pd are arranged alternately so as to be a reversed phase spatially. Therefore, two kinds of arranging patterns are repeated alternately in respective recording tracks. As shown in FIG. 1, it is noted that the data pits Pd are aligned in every two tracks in the disk radial direction.

In the servo area 1b, as shown in FIG. 1, synchronization pits Ps, tracking pits Pt and guard pits Pg1 to Pg4 are formed. In these pits, the synchronization pit Ps serves as a reference pit for synchronous control at the time of reproduction and is aligned in the disk radial direction. The synchronization pit Ps has a pit length 2L, which corresponds to the pit period of the data pit Pd.

The tracking pit Pt serves as a reference pit for tracking servo control of the optical disk 1. The tracking pits Pt are arranged so that the pit positions thereof are shifted by a specific distance in the disk circumferential direction at every four-track period.

The guard pits Pg1 to Pg4 are placed on the both ends of the servo area 1b and serve to decrease the intersymbol interference between the data area 1a and the servo area 1b. As shown in FIG. 1, the guard pits Pg1 and Pg2 are arranged at one end of the servo area 1b on one track and the guard pits Pg3 and Pg4 are arranged at the other end of the servo area 1b on one track. The guard pits Pg1 and Pg4 have three-value pit edges at the side neighboring to the data area 1a and the pit edges at the opposite side are fixed. On the other hand, both pit edges of the guard pits Pg2 and Pg3 are fixed.

Further, the number of repetition of the data area 1a and the servo area 1b may be set appropriately within one track. For example, it is possible to repeat them alternately within one track for about 100 to 10,000 times.

In order to reproduce the optical disk 1 shown in FIG. 1, a beam spot SP, which is formed by radiating a reproduction laser beam, traces a center line of the adjacent two recording tracks shown by a broken line in FIG. 1. In this case, the beam spot SP simultaneously covers two pit edges on the two adjacent recording tracks along the disk radial direction. Then, a five-value digital data of (0, 1, 2, 3, 4), produced by the addition of two three-value data, i.e., (0, 1, 2) of respective pit edge, is obtained on the basis of the reflected light of the beam spot SP.

Figure 3:
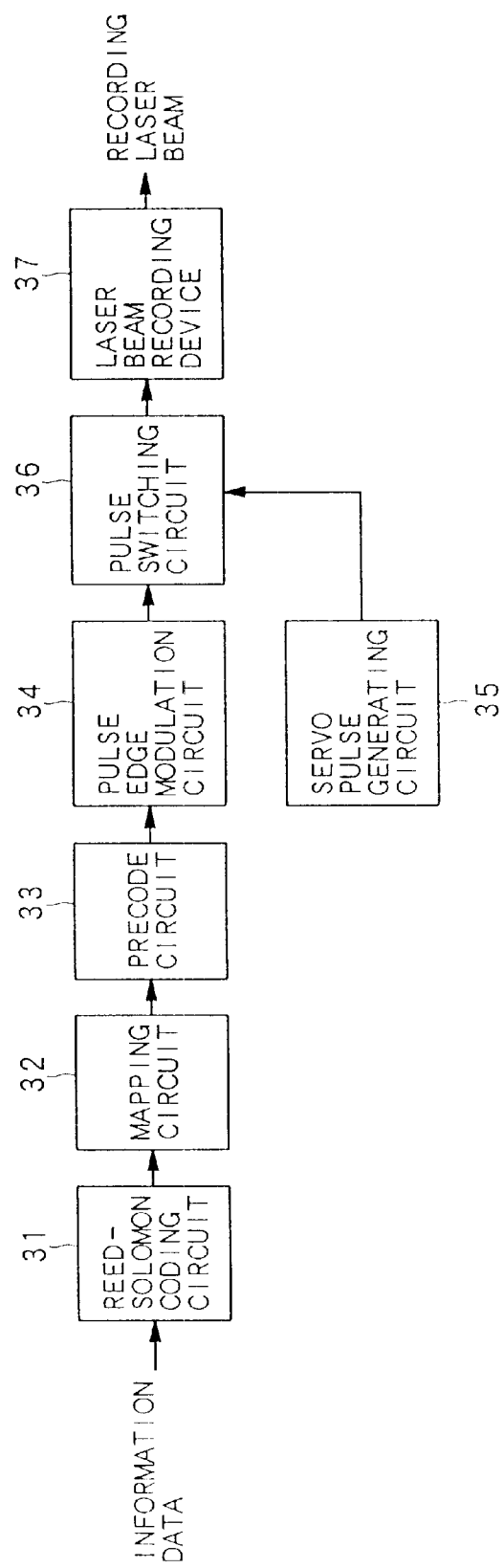
FIG. 3 is a block diagram showing a schematic configuration of an optical disk recording apparatus according to the present embodiment.

FIG. 3 is a block diagram showing a schematic configuration of an optical disk recording apparatus for recording digital data on the optical disk 1 according to the present embodiment. The optical disk recording apparatus shown in FIG. 3 includes a Reed-Solomon coding circuit 31, a mapping circuit 32, a precode circuit 33, a pulse edge modulation circuit 34, a servo pulse generating circuit 35, a pulse switching circuit 36 and a laser beam recording device 37.

In the above arrangement, the Reed-Solomon coding circuit 31 applies Reed-Solomon coding for error correction to the inputted information data and converts it into error correction codes. Here, the error correction codes outputted from the Reed-Solomon coding circuit 31 has a two-value level. The mapping circuit 32 converts the error correction codes into two multi-value symbols having three-value level, i.e., (0, 1, 2) for every three bits. The precode circuit 33 applies precode arithmetical operation to the multi-value symbols outputted from the mapping circuit 32 and converts them to three-value level recording symbols. The pulse edge modulation circuit 34 generates modulation pulses, which pulse edge position changes in three steps in accordance with the three-value level recording code outputted from the precode circuit 33.

On the other hand, the servo pulse generating circuit 35 generates a servo pulse for forming the pit pattern in the servo area 1b. In other words, the pulse positions of the servo pulses are set in accordance with respective pit positions of the synchronization pits Ps, the tracking pits Pt and the guard pits Pg1 to Pg4. Further, the pulse switching circuit 36 switches the output from the pulse edge modulation circuit 34 and the output from the servo pulse generating circuit 35 alternately in response to the arrangement of the data areas 1a and the servo areas 1b to output the recording pulse, in which the servo pulses are inserted at a constant period in the modulation pulses. The laser beam recording device 37 performs on-off control of the recording laser beam on the basis of the recording pulse outputted from the pulse switching circuit 36 to form lines of pits having convexo-concave shapes on the optical disk 1. Thus, the optical disk 1 can be obtained, in which the data areas 1a and the servo areas 1b are alternately formed.

Figure 4:
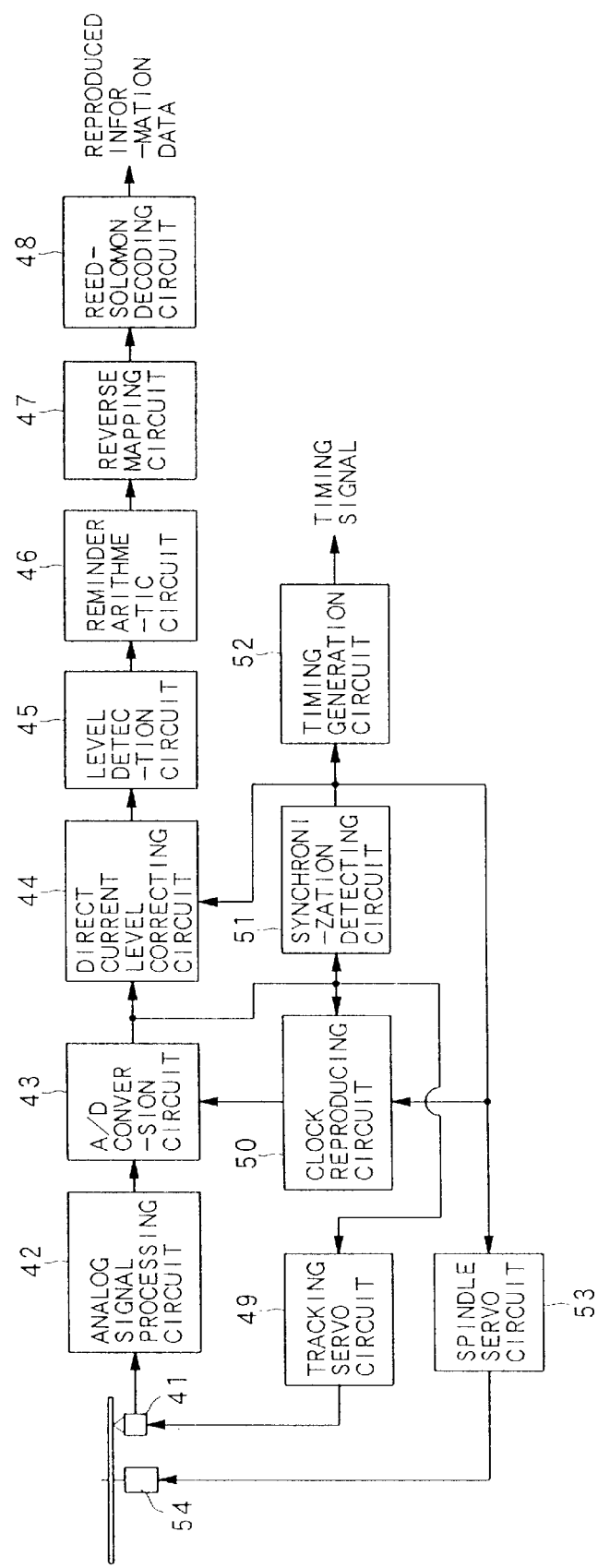
FIG. 4 is a block diagram showing a schematic configuration of an optical disk reproducing apparatus according to the present embodiment.

Next, with reference to FIGS. 4 and 5, a schematic configuration and operation of the optical disk reproducing apparatus according to the present embodiment will be explained below. FIG. 4 is a block diagram showing a schematic configuration of the optical disk reproducing apparatus, and FIGS. 5A to 5C show the operational waveforms of respective units in the optical disk reproducing apparatus.

The optical disk reproducing apparatus for reproducing the digital data recorded on the optical disk 1 as shown in FIG. 4 includes an optical pickup 41, an analog signal processing circuit 42, an A/D conversion circuit 43, a direct current level correcting circuit 44, a level detection circuit 45, a reminder arithmetic circuit 46, a reverse mapping circuit 47, a Reed-Solomon decoding circuit 48, a tracking servo circuit 49, a clock reproducing circuit 50, a synchronization detecting circuit 51, a timing generation circuit 52, a spindle servo circuit 53 and a spindle motor 54.

In the above arrangement, the optical pickup 41 irradiates a reproduced laser beam onto the optical disk 1, receives the reflected light from the beam spot SP and generates the reading signal by a photoelectric conversion. The analog signal processing circuit 42 amplifies the reading signal to a required level and removes the direct current component by a high-pass filter to reduce the low frequency noise. Then, the analog signal processing circuit 42 carries out waveform equalization for reducing the intersymbol interference and outputs the reading signal as the analog reproduction signal.

Figure 5A:
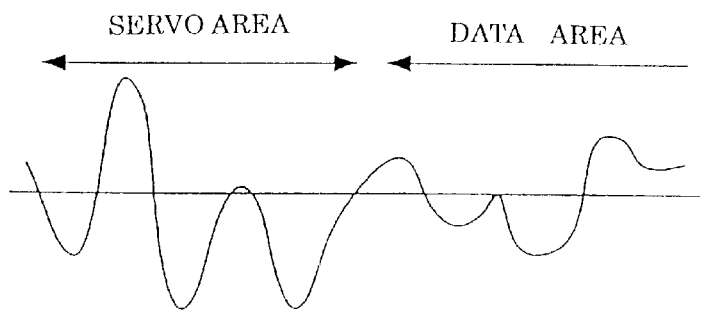
FIG. 5A shows a waveform pattern of an analog reproduction signal in the operational waveforms of respective units in the optical disk reproducing apparatus according to the present embodiment.

FIG. 5A shows an example of a waveform pattern of the analog reproduction signal outputted from the analog signal processing circuit 42. In the waveform shown in FIG. 5A, a first half thereof is a waveform corresponding to the servo area 1b and a last half thereof is a waveform corresponding to the data area 1a. In the servo area 1b, it is apparent that the peak level is relatively larger compared with the data area 1a. It is assumed that reproducing the pit results in a high level analog reproduction signal, and reproducing the space results in a low level analog reproduction signal.

The A/D conversion circuit 43 is synchronized with the reproduction clock supplied from the clock reproducing circuit 50 to sample the analog reproduction signal, and outputs the corresponding sample value sequence. On the other hand, the clock reproducing circuit 50 includes a PLL and generates the reproduction clock, which is synchronized with the analog reproduction signal in phase, to output the reproduction clock to the A/D conversion circuit 43. This clock reproducing circuit 50 detects frequency error and phase error of the reproduction clock with respect to the analog reproduction signal, and controls the frequency and the phase of the reproduction clock in response to the detection result. The detail of the generation of the reproduction clock will be described later.

Figure 5B:
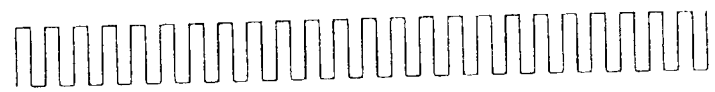
FIG. 5B shows a waveform pattern of reproduction clock in the operational waveforms of respective units in the optical disk reproducing apparatus according to the present embodiment.

FIG. 5B shows a waveform pattern of the reproduction clock supplied from the clock reproducing circuit 50. FIG. 5C shows a waveform pattern of the sample value sequence outputted from the A/D conversion circuit 43. In the waveform pattern of FIG. 5B, for example, by sampling the analog reproduction signal in FIG. 5A at the rising timing of each pulse, the sample value sequence as shown in FIG. 5C may be obtained. As shown in FIG. 5C, a peak level of the data area 1a is Sp. On the contrary, the peak level of the servo area 1b is approximately 2Sp. Therefore, by using the difference between these peak levels, the synchronization detection can be carried out as described later.

The direct current level correcting circuit 44 detects the direct current level in the sample value sequence outputted from the A/D conversion circuit 43, and corrects the direct current level by subtracting the detected value from the sample value sequence. Thereby, the direct current component in the analog reproduction signal, once lost, can be restored. The detail of detecting the direct current level by the direct current level correcting circuit 44 will be described later.

The level detection circuit 45 compares the sample value sequence outputted from the direct current level correcting circuit 44 with four threshold values, set in advance, to output the five-value detection symbols. The remainder arithmetic circuit 46 divides the detection symbol of five-value level by 3 to derive the reminder, and outputs it as reproduction symbols of three-value levels, i.e., (0, 1, 2). The reverse mapping circuit 47 performs a reverse conversion, which is reverse to the processing of the mapping circuit 32 of FIG. 3, i.e., to convert two reproduction symbols of three-value levels into three-bit reproduction codes having two-value levels. The Reed-Solomon decoding circuit 48 performs the error correction decoding of the Reed-Solomon code to the reproduction codes to convert the reproduction codes to the reproduction information data.

In this way, the information data recorded on the optical disk 1 by the optical disk recording apparatus of FIG. 3 is reproduced by the optical disk reproducing apparatus of FIG. 4 as a reproduction information data. At this time, a precode calculation in the optical disk recording apparatus is reverse arithmetic operation of the addition of the reading signal level in the optical disk reproducing apparatus and the reminder calculation of the detection symbols. Therefore, the same data is restored.

On the other hand, the synchronization detecting circuit 51 compares the sample value sequence outputted from the A/D conversion circuit 43 with a predetermined threshold value to detect the segment in which the peak level is large in response to the synchronization pit Ps, and outputs the synchronization detecting signal for achieving the synchronization of reproduction system. The detail of operation of the synchronization detecting circuit 51 will be described later. The timing generation circuit 52 supplies respective timing signals to respective units of the optical disk reproducing apparatus on the basis of the synchronization detecting signal.

Figure 5C:
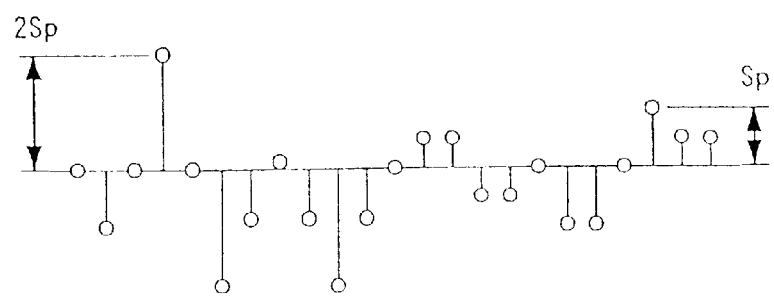
FIG. 5C shows a waveform pattern of sample value sequence in the operational waveforms of respective units in the optical disk reproducing apparatus according to the present embodiment.

In the case of the sample value sequence in FIG. 5C, for example, by setting the above threshold value to 1.3 Sp, it becomes easy to distinguish the peak level 2Sp of the servo area 1b from the peak level Sp of the data area 1a. Accordingly, by detecting the segment having a peak level, that is larger than the threshold value level, as the synchronization pit Ps, the synchronous detection becomes possible on the basis of the sample value sequence.

There are two reasons why the peak level becomes large in the segment of the synchronization pit Ps. The first reason is that the pit length of the synchronization pit Ps is set to 2L, i.e., twice the pit length L of the data pit Pd. The second reason is that, while a pit arrangement between the adjacent recording tracks is in same phase for the synchronization pit Ps, the pit arrangement between the adjacent recording tracks is in reverse phase for the data pits Pd. In other words, in the synchronization pits Ps aligned in the disk radial direction, the analog reproduction signals enhance the level of each other between two adjacent recording tracks. On the contrary, in the data pits Pd aligned in the disk radial direction, the analog reproduction signals weaken the level of each other between two adjacent recording tracks.

The tracking servo circuit 49 carries out a certain arithmetic operation to the segment corresponding to the tracking pit Pt among the sample value sequence outputted from the A/D conversion circuit 43 and detects a tracking error. Then, the tracking servo circuit 49 controls the position in the disk radial direction of the reproduction laser beam emitted by the pickup 41 on the basis of the detected tracking error. The spindle servo circuit 53 controls the rotational rate of the spindle motor 54 so that the synchronization detecting signal output from the synchronization detecting circuit 51 is kept at a specific period. Then, the spindle motor 54 rotatably drives the optical disk 1 under the control by the spindle servo circuit 53.

Figure 6:
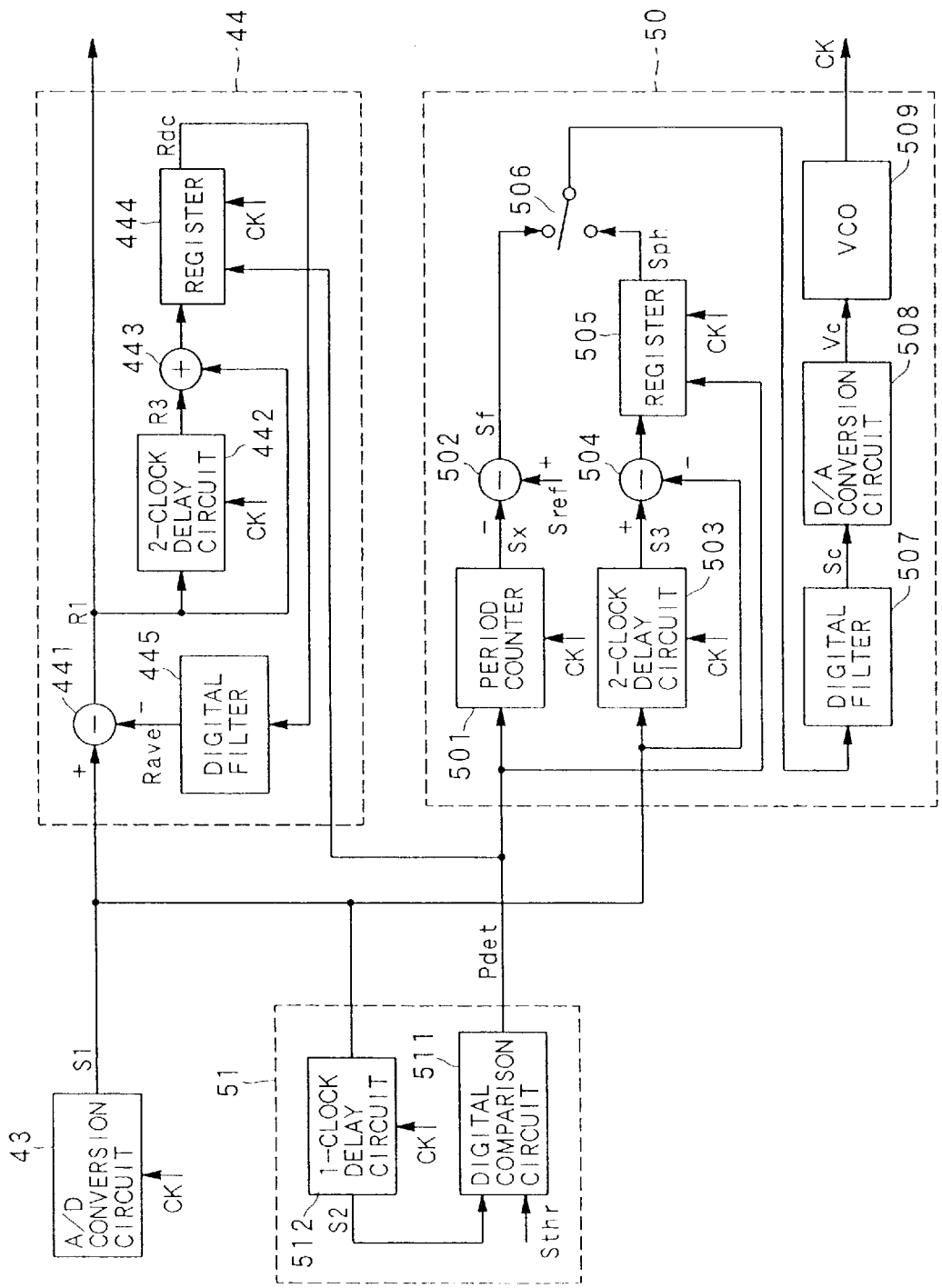
FIG. 6 is a block diagram showing a detailed configuration of a direct current level correcting circuit, a clock reproducing circuit and a synchronization detecting circuit.

With reference to FIGS. 6 to 8, the configuration and the operation of respective units in the optical disk reproducing apparatus will be explained in detail below. FIG. 6 is a block diagram showing a detailed configuration of the direct current level correcting circuit 44, the clock reproducing circuit 50 and the synchronization detecting circuit 51. FIG. 7 is the operational waveform for explaining detection of a phase error by the clock reproducing circuit 50. FIG. 8 is the operational waveform for explaining detection of direct current error by the direct current level correcting circuit 44.

As shown in FIG. 6, the synchronization detecting circuit 51 includes a one-clock delay circuit 511 and a digital comparison circuit 512. The clock reproducing circuit 50 includes a period counter 501, a subtracter 502, a two-clock delay circuit 503, a subtracter 504, a register 505, a switch 506, a digital filter 507, a D/A conversion circuit 508, and a VCO 509. The direct current level correcting circuit 44 includes a subtracter 441, a two-clock delay circuit 442, an adder 443, a register 444 and a digital filter 445. In FIG. 6, a sample value S1 outputted from the A/D conversion circuit 43 is inputted to the direct current level correcting circuit 44, the clock reproducing circuit 50 and the synchronization detecting circuit 51, respectively.

In the synchronization detecting circuit 51, the one-clock delay circuit 511 delays the inputted sample value S1 by 1 clock on the basis of the reproduction clock CK to output the sample value S2. The one-clock delay circuit 511 is provided to adjust timing to that of other circuits. The digital comparison circuit 512 compares the sample value S2 with a predetermined threshold value Sthr for detecting the synchronization. Then, if the comparison result is S2>Sthr, the digital comparison circuit 512 outputs the synchronization detecting signal Pdet. As described above, if the peak level of the data area 1a is Sp, setting a threshold value Sthr between Sp and 2Sp allows the synchronization detecting signal Pdet to be outputted in response to the synchronization pit Ps.

In the clock reproducing circuit 50, the period counter 501 counts the period of the synchronization detecting signal Pdet by the reproduction clock CK to output the count value Sx. The subtracter 502 subtracts the count value Sx from a preset reference count value Sref to output a frequency error Sf=Sref−Sx. Therefore, in the case that the count value Sx is equal to the reference count value Sref, the frequency error Sf becomes zero. On the contrary, in the case that the count value Sx deviates from the reference count value Sref, if Sx<Sref, the frequency error Sf becomes positive, and if Sx>Sref, the frequency error Sf becomes negative.

Here, the reference count value Sref may be a value obtained by dividing the period of the synchronization pit Ps by a correct frequency of the reproduction clock CK.

On the other hand, the two-clock delay circuit 503 delays the inputted sample values S1 by two clocks on the basis of the reproduction clock CK to output the sample values S3. The subtracter 504 subtracts the sample value S1 from the sample value S3 to output the difference value (S3−S1). The register 505 stores the difference value (S3−S1) at the detection timing of the synchronization detecting signal Pdet and outputs this difference value (S3−S1) as a phase error Sph.

Figure 7A:
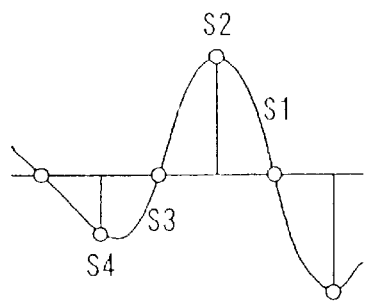
FIG. 7 is the operational waveform for explaining detection of a phase error by the clock reproducing circuit.
Figure 7B:
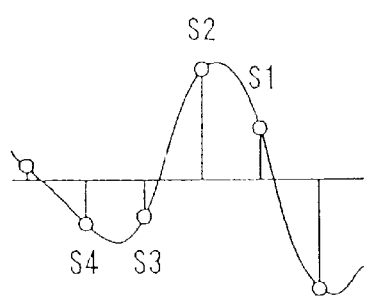
Figure 7C:
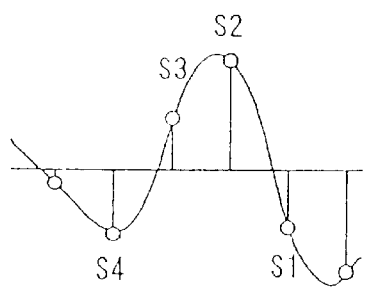

In FIG. 7, in order to explain change of the phase error Sph, the sample value sequence corresponding to the deviation of the reproduction clock CK is illustrated as being superimposed on the analog reproduction signal. FIG. 7A shows a case that the phase of the reproduction clock CK is in phase with the sample value sequence, FIG. 7B shows a case that the phase of the reproduction clock CK is preceding, and FIG. 7C shows a case that the phase of the reproduction clock CK is delaying, respectively. With respect to the phase error of Sph=S3−S1 of FIG. 7A, since a phase at a zero cross point of the analog reproduction signal coincides with the phase of the reproduction clock CK and the sample value S1 equals to the sample value S3, the phase error Sph becomes zero. On the other hand, in FIGS. 7B and 7C, the phase at the zero cross point of the analog reproduction signal does not coincide with the phase of the reproduction clock CK. In FIG. 7B, the phase error Sph becomes negative. In FIG. 7C, the phase error Sph becomes positive. Accordingly, the phase of the reproduction clock CK may be constantly kept to be in phase with the sample value sequence by controlling the phase so that the phase error Sph approaches zero.

The switch 506 switches the output of the subtracter 502 and the output from the register 505 to output one of the frequency error Sf and the phase error Sph to the subsequent stage. For example, in the case of establishing the phase synchronization after establishing the frequency synchronization, at first, the switch 506 is set to the side of the subtracter 502 and then is switched to the side of the register 505 at an appropriate timing. The digital filter 507 filters the frequency error Sf or the phase error Sph to perform waveform-shaping and outputs a control sample Sc. The D/A conversion circuit 508 converts the control sample Sc into an analog signal to output this analog signal as a control voltage Vc. A VCO (Voltage Controlled Oscillator) 50 can perform variable-control of the oscillating frequency and generates the reproduction clock CK having a frequency corresponding to the control voltage Vc.

In the direct current level correcting circuit 44, the subtracter 441 subtracts an average direct current error Rave from the inputted sample value S1 to output a corrected sample value R1. This corrected sample value R1 is outputted to the level detection circuit 45 as shown in FIG. 4. Here, the average direct current error Rave is outputted from the digital filter 445. The digital filter 445 filters a direct current error Rdc, described later, to perfoem waveform-shaping thereon, and generates the average direct current error Rave to output it to the subtracter 441.

On the other hand, the two-clock delay circuit 442 delays the corrected sample value R1 by two clocks on the basis of the reproduction clock CK to output the corrected sample value R3. The adder 443 adds the corrected sample value R3 to the corrected sample value R1 to output the added value (R1+R3). The register 444 stores the added value (R1+R3) at the detection timing of the synchronization detecting signal Pdet, and outputs this added value (R1+R3) as the above described direct current error Rdc.

Figure 8A:
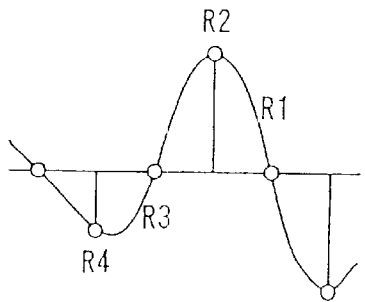
FIG. 8 is the operational waveform for explaining detection of a direct current error by the direct current level correcting circuit.
Figure 8B:
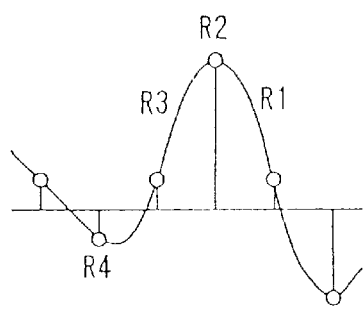
Figure 8C:
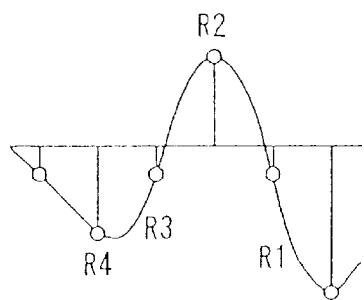

In FIG. 8, the sample value sequence in the case that the direct current error Rdc changes is illustrated in a manner being superimposed on the analog reproduction signal. FIG. 8A shows a case that the direct current level of the analog reproduction signal is zero, FIG. 8B shows a case that the direct current level of the analog reproduction signal is positive, and FIG. 8C shows a case that the direct current level of the analog reproduction signal is negative. It is noted that the direct current error Rdc=R1+R3 is zero in FIG. 8A, the direct current error of Rdc=R1+R3 is positive in FIG. 8B, and the direct current error of Rdc=R1+R3 is negative in FIG. 8C. Accordingly, the direct current level of the sample value sequence may be kept appropriately at all times by correcting the direct current level so that the direct current error Rdc approaches zero.

As described above, the optical disk reproducing apparatus according to the present embodiment enables the synchronous detection and an appropriate clock reproduction when reproducing the digital data recorded on the optical disk 1 by using the pit edge multi-value recording system. In other words, by utilizing the fact that the peak level of the analog reproduction signal of the synchronization pit Ps is relatively large due to the difference in the pit length and the pit position of the synchronization pit Ps and the data pit Pd, it is possible to easily detect the synchronization in the synchronization detecting circuit 51. Further, according to the optical disk reproducing apparatus according to the present embodiment, the frequency of the reproduction clock can be controlled on the basis of the detected frequency of the synchronization pit Ps, and the phase of the reproduction clock can be controlled on the basis of the sample value corresponding to the pit edge before and after of the synchronization pit Ps in the clock reproducing circuit 50. Therefore, the frequency and the phase of the reproduction clock can be held accurately at all times. Further, in the direct current level correcting circuit 44, the direct current level can be corrected by obtaining the direct current error of the sample value sequence on the basis of the sample value corresponding to the pit edge before and after of the synchronization pit Ps.

The practical operational procedure of the optical disk reproducing apparatus according to the present embodiment will be explained below. At first, when activating the optical disk reproducing apparatus or after track search, the synchronization detecting circuit 51 detects the synchronization pit Ps. In the state that the synchronization pit Ps is detected, the clock reproducing circuit 50 controls the frequency of the reproduction clock with the frequency error Sf. Then, in the state that the frequency is stable, the switch 506 of the clock reproducing circuit 50 is switched and the phase of the reproduction clock is controlled with the phase error Sph. Finally, by using the reproduction clock in which the frequency and the phase are synchronized, the A/D conversion circuit 43 samples the analog reproduction signal to reproduce an appropriate digital data.

With reference to FIG. 9, a modified example of the above embodiment is explained. FIG. 9 is an explanatory view illustrating a pit position corresponding to a modified example of the optical disk 1 shown in FIG. 1. This modified example is the same as the embodiment shown in FIG. 1 in that the data areas 1a and the servo areas 1b are alternately formed in the optical disk 1, and that the data pit Pd of the data area 1a, the tracking pit Pt of the servo area 1b and the guard pits Pg1 to Pg4 are formed. On the other hand, the modified example is different from the embodiment shown in FIG. 1 in that a synchronous space Ss is provided in place of the synchronization pit Ps, and that a clock pit Pc is further provided.

In FIG. 9, the synchronous space Ss is arranged in a line at the same position on the recording track. The length of the synchronous space Ss is 2L, which is the same as that of the synchronization pit Ps and corresponds to the pit frequency of the data pit Pd. Further, the clock pits Pc are arranged in a line at the position close to the synchronous space Ss in the disk radial direction, and the pit length thereof is L.

The synchronous space Ss has the same function as the above described synchronization pit Ps and serves as a reference of the synchronous control at the time of reproduction. However, since the synchronous space Ss has a negative peak level in the sample value sequence, it is necessary to output the synchronization detecting signal Pdet when the level of the sample value exceeds the negative threshold value Sthr in the synchronization detecting circuit 51. Thus, the synchronization detecting signal Pdet corresponding to the synchronous space Ss is outputted from the synchronization detecting circuit 51. Further, the clock reproducing circuit 50 controls the frequency of the reproduction clock on the basis of the synchronization detecting signal Pdet.

On the other hand, the clock pit Pc serves to derive the phase error Sph and the direct current error Rdc on the basis of the sample values before and after pit edge thereof. Thus, the clock reproducing circuit 50 controls the phase of the reproduction clock by using the phase error Sph, and the direct current level correcting circuit 44 corrects the direct current level of the sample value sequence in response to the direct current error Rdc.

The preferred embodiments of the present invention have been described in detail with reference to the accompanying drawings. However, it is to be understood that the practical arrangement is not limited to these specific embodiments, and that various design changes may be made without departing from the spirit and scope of the present invention. Specific modified examples of the present invention are explained below.

In the above described embodiment, there are disclosed a method of detecting the positive peak level of the sample value sequence in response to the synchronization pit Ps and outputting the synchronization detecting signal and a method of detecting the negative peak level of the sample value sequence in response to the synchronous space Ss and outputting the synchronization detecting signal. However, other methods may be employed. For example, a segment in which the level difference of plural sample values having specific intervals exceeds a certain value may be detected as a segment corresponding to the synchronization pit Ps or the synchronous space Ss to output the synchronization detecting signal. Further, a segment in which the level difference of the positive peak level and the negative peak level of the sample value sequence exceeds a certain value may be detected as a segment corresponding to the synchronization pit Ps or the synchronous space Ss to output the synchronization detecting signal.

In the above described embodiments, the A/D conversion circuit 43 converts the analog reproduction signal into the sample value sequence and thereby detects the synchronism. However, the synchronization detection may be carried out directly on the basis of the analog reproduction signal, without performing the A/D conversion. In other words, the amplitude of the analog reproduction signal is large in the segment of the synchronization pit Ps and is small in the segment of the data pit Pd. Therefore, by detecting the amplitude of the analog reproduction signal, the synchronization pit Ps may be determined.

The above described embodiments are directed to the case where the pit length of the synchronization pit Ps is 2L, which corresponds to the pit period 2L of the data pit Pd. However, the pit length of the synchronization pit Ps may be 3L. Further, the pit length of the synchronization pit Ps may be N×L in regard to an integer N not less than 2. In that case, when the sample value corresponding to the pit edge before and after the synchronization pit Ps is used in the direct current level correcting circuit 44 and the clock reproducing circuit 50, an N-clock delay circuit may be provided.

Further, when the direct current error is not obtained on the basis of the synchronization pit Ps but the direct current level is corrected by other means in the direct current level correcting circuit 44, the pit length Pd of the synchronization pit Ps may be 2.5 L, for example. In the embodiment of FIG. 1, in order to correct the direct current level, the sample value corresponding to the pit edge position of the synchronization pit Ps should be used. However, in the present case, it is not necessary to use the sample value corresponding to the pit edge position of the synchronization pit Ps. Therefore, the pit length of the synchronization pit Ps should be sufficiently large to enable the synchronous detection. Approximately, the pit length of the synchronization pit Ps may be not less than 2L.

In the above described embodiments, the explanations are given to the case that the synchronization pit Ps is used not only as a synchronous reference but as a reference for controlling the phase of the reproduction clock. However, clock pits may be provided other than the synchronization pits Ps. Further, both of the synchronization pits Ps and the synchronous spaces Ss may be provided.

In the above described embodiments, the explanation is given to the case that the pit edge is varied in the three steps by the pit edge multi-value recording system to use the digital data of the three-value level. However, the present invention is not limited by the above. The present invention may be applied when the multi-value digital data not less than four values may be employed. Thus, even when the number of the multi-value level increase, if the amplitude of the analog reproduction signal corresponding to the synchronization pit Ps is sufficiently ensured, it is possible to detect the synchronization on the basis of the synchronization pit Ps.

Further, in the above described embodiment, there is disclosed a system in which two tracks and two pit edges on one radial line are read at the same time by radiating the reproduction laser beam. However, the present invention is not limited to this system and various reading methods may be applied to the present invention. For example, it is possible to employ a method in which one pit edge located on one track and one radial line may be read and a method in which two pit edges located on one track and two radial lines may be read. Further, a method in which four pit edges located on two tracks and two radial lines are read simultaneously may be employed.

In the above described embodiment, the case that the present invention is applied to the optical disk for reproduction only is explained. However, even when an information recording medium of write once type and an information recording medium of rewrite type are employed, the present invention may be applied. In that case, a convexo-concave pit shape may be formed in the servo area 1b in advance and the data pit Pd may be recorded in the data area 1a by using a phase-change recording system and an optical magnetic recording system.

As described above, according to the present invention, the synchronization pits are provided in the servo area of the optical disk using the pit edge multi-value recording system, and the pit length and the pit position are set so that the amplitude of the reproduction signal is sufficiently large in the segment of the synchronization pit compared with that in the segment of the data pits. Therefore, the synchronous detection may be ensured. Further, the clock reproduction and the direct current correction are carried out stably on the basis of the synchronization pits. In this way, according to the present invention, digital data is reproduced accurately to improve the reproduction performance, without employing complicated configuration.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 11-281992 filed on Oct. 1, 1999 including the specification, claims, drawings and summary is incorporated herein by reference in its entirety.

What is claimed is:

1. An optical disk on which digital data is recorded by a pit edge multi-value recording system, comprising:

a plurality of data areas formed with a plurality of data pits with a predetermined pit period, each of the plurality of data pits comprising one of a plurality of pit edge positions each corresponding to the digital data; and a plurality of servo areas formed with servo reference pits used for servo control, the data areas and the servo areas being formed alternately with each other in a circumferential direction of the optical disk, the servo area including synchronization pits functioning as synchronization reference in reproducing the optical disk, wherein a pit period 2L of the data pit and a pit length P of the synchronization pit satisfy the following equation:

$$P = N \times L \text{ (N is an integer not less than 2).}$$

2. An optical disk according to claim 1, wherein said data pits are arranged such that the data pits formed on two neighboring tracks are in reverse phase with each other, and wherein the synchronization pits are arranged such that the synchronization pits formed on two neighboring tracks are in alignment with each other in a radial direction of the optical disk.

3. An optical disk on which digital data is recorded by a pit edge multi-value recording system, comprising:

a plurality of data areas formed with a plurality of data pits with a predetermined pit period, each of the plurality of data pits comprising one of a plurality of pit edge positions each corresponding to the digital data; and a plurality of servo areas formed with servo reference pits used for servo control, the data areas and the servo areas being formed alternately with each other in a circumferential direction of the optical disk, the servo area including synchronization spaces functioning as synchronization reference in reproducing the optical disk, wherein a pit period 2L of the data pit and a length S of the synchronization space satisfy the following equation:

$$S = N \times L \text{ (N is an integer not less than 2).}$$

4. An optical disk according to claim 3, wherein said data pits are arranged such that the data pits formed on two neighboring tracks are in reverse phase with each other, and wherein the synchronization spaces are arranged such that the synchronization spaces formed on two neighboring tracks are in alignment with each other in a radial direction of the optical disk.

5. An optical disk reproducing apparatus for reproducing an optical disk on which digital data is recorded by a pit edge multi-value recording system, comprising:

a plurality of data areas formed with a plurality of data pits with a predetermined pit period, each of the plurality of data pits comprising one of a plurality of pit edge positions each corresponding to the digital data; and a plurality of servo areas formed with servo reference pits used for servo control, the data areas and the servo areas being formed alternately with each other in a circumferential direction of the optical disk, the servo area including synchronization pits functioning as synchronization reference in reproducing the optical disk, wherein a pit period 2L of the data pit and a pit length P of the synchronization pit satisfy the following equation:

P=N×L (N is an integer not less than 2), the apparatus comprising:

a reading unit for irradiating a laser beam onto the optical disk to generate a reproduction signal; and a synchronization detecting unit for detecting segments, in which the reproduction signal has an amplitude larger than a predetermined value, as a segment corresponding to the synchronization pit and for outputting a synchronization detection signal, wherein the synchronization detection signal is used as a synchronization reference in reproducing the optical disk.

6. An apparatus according to claim 5, further comprising:

an A/D converter for sampling the reproduction signal in synchronism with reproduction clock to produce sample value sequence and for outputting the sample value sequence; and a clock reproduction unit for generating reproduction clock based on the sample value sequence.

7. An apparatus according to claim 6, wherein the clock reproduction unit controls frequency of the reproduction clock based on a period of the synchronization detection signal.

8. An apparatus according to claim 6, wherein the clock reproduction unit controls phase of the reproduction clock based on plural sample values corresponding to positions of the synchronization pits.

9. An apparatus according to claim 6, further comprising a direct current level corrector for correcting direct current level of the sample value sequence based on the plural sample values corresponding to the positions of the synchronization pits.

10. An optical disk reproducing apparatus for reproducing an optical disk on which digital data is recorded by a pit edge multi-value recording system, comprising:

a plurality of data areas formed with a plurality of data pits with a predetermined pit period, each of the plurality of data pits comprising one of a plurality of pit edge positions each corresponding to the digital data; and a plurality of servo areas formed with servo reference pits used for servo control, the data areas and the servo areas being formed alternately with each other in a circumferential direction of the optical disk, the servo area including synchronization spaces functioning as synchronization reference in reproducing the optical disk, wherein a pit period 2L of the data pit and a length S of the synchronization space satisfy the following equation:

S=N×L (N is an integer not less than 2), the apparatus comprising:

a reading unit for irradiating a laser beam onto the optical disk to generate a reproduction signal; and a synchronization detecting unit for detecting segments, in which the reproduction signal has an amplitude larger than a predetermined value, as a segment corresponding to the synchronization space and for outputting a synchronization detection signal, wherein the synchronization detection signal is used as a synchronization reference in reproducing the optical disk.

11. An optical disk reproducing apparatus for reproducing an optical disk on which digital data is recorded by a pit edge multi-value recording system, comprising:

a plurality of data areas formed with a plurality of data pits with a predetermined pit period, each of the plurality of data pits comprising one of a plurality of pit edge positions each corresponding to the digital data; and a plurality of servo areas formed with servo reference pits used for servo control, the data areas and the servo areas being formed alternately with each other in a circumferential direction of the optical disk, the servo area including synchronization pits functioning as synchronization reference in reproducing the optical disk, wherein a pit period 2L of the data pit and a pit length P of the synchronization pit satisfy the following equation:

P=N×L (N is an integer not less than 2), the apparatus comprising:

a reading unit for irradiating a laser beam onto the optical disk to generate a reproduction signal; and a synchronization detecting unit for detecting segments, in which the reproduction signal has a peak level larger than a predetermined threshold value, as a segment corresponding to the synchronization pit and for outputting a synchronization detection signal, wherein the synchronization detection signal is used as a synchronization reference in reproducing the optical disk.

12. An optical disk reproducing apparatus for reproducing an optical disk on which digital data is recorded by a pit edge multi-value recording system, comprising:

a plurality of data areas formed with a plurality of data pits with a predetermined pit period, each of the plurality of data pits comprising one of a plurality of pit edge positions each corresponding to the digital data; and a plurality of servo areas formed with servo reference pits used for servo control, the data areas and the servo areas being formed alternately with each other in a circumferential direction of the optical disk, the servo area including synchronization pits functioning as synchronization reference in reproducing the optical disk, wherein a pit period 2L of the data pit and a pit length P of the synchronization pit satisfy the following equation:

P=N×L (N is an integer not less than 2), wherein said data pits are arranged such that the data pits formed on two neighboring tracks are in reverse phase with each other, and wherein the synchronization pits are arranged such that the synchronization pits formed on two neighboring tracks are in alignment with each other in a radial direction of the optical disk, the apparatus comprising:

a reading unit for irradiating a laser beam onto a center line of two neighboring tracks on the optical disk to generate a reproduction signal; and a synchronization detecting unit for detecting segments, in which the reproduction signal has a peak level larger than a predetermined threshold value, as a segment corresponding to the synchronization pit and for outputting a synchronization detection signal, wherein the synchronization detection signal is used as a synchronization reference in reproducing the optical disk.

13. An optical disk reproducing apparatus for reproducing an optical disk on which digital data is recorded by a pit edge multi-value recording system, comprising:

a plurality of data areas formed with a plurality of data pits with a predetermined pit period, each of the plurality of data pits comprising one of a plurality of pit edge positions each corresponding to the digital data; and a plurality of servo areas formed with servo reference pits used for servo control, the data areas and the servo areas being formed alternately with each other in a circumferential direction of the optical disk, the servo area including synchronization spaces functioning as synchronization reference in reproducing the optical disk, wherein a pit period 2L of the data pit and a length S of the synchronization space satisfy the following equation:

$$S = N \times L \text{ (N is an integer not less than 2),}$$

the apparatus comprising:

a reading unit for irradiating a laser beam onto the optical disk to generate a reproduction signal; and a synchronization detecting unit for detecting segments, in which the reproduction signal has a peak level larger than a predetermined threshold value, as a segment corresponding to the synchronization space and for outputting a synchronization detection signal, wherein the synchronization detection signal is used as a synchronization reference in reproducing the optical disk.

14. An optical disk reproducing apparatus for reproducing an optical disk on which digital data is recorded by a pit edge multi-value recording system, comprising:

a plurality of data areas formed with a plurality of data pits with a predetermined pit period, each of the plurality of data pits comprising one of a plurality of pit edge positions each corresponding to the digital data; and a plurality of servo areas formed with servo reference pits used for servo control, the data areas and the servo areas being formed alternately with each other in a circumferential direction of the optical disk, the servo area including synchronization spaces functioning as synchronization reference in reproducing the optical disk, wherein a pit period 2L of the data pit and a length S of the synchronization space satisfy the following equation:

$$S = N \times L \text{ (N is an integer not less than 2),}$$

wherein said data pits are arranged such that the data pits formed on two neighboring tracks are in reverse phase with each other, and wherein the synchronization spaces are arranged such that the synchronization spaces formed on two neighboring tracks are in alignment with each other in a radial direction of the optical disk, the apparatus comprising:

a reading unit for irradiating a laser beam onto a center line of two neighboring recording tracks on the optical disk to generate a reproduction signal; and a synchronization detecting unit for detecting segments, in which the reproduction signal has a peak level larger than a predetermined threshold value, as a segment corresponding to the synchronization space and for outputting a synchronization detection signal, wherein the synchronization detection signal is used as a synchronization reference in reproducing the optical disk.

* * * * *